United States Patent
Husain et al.

(10) Patent No.: US 7,767,089 B2
(45) Date of Patent: Aug. 3, 2010

(54) MEMBRANE SUPPORTED BIOFILM PROCESS FOR AUTOTROPIC REDUCTION

(75) Inventors: Hidayat Husain, Oakville (CA); Henry Behmann, Puslinch (CA); Pierre Lucien Cote, Dundas (CA)

(73) Assignee: Zenon Environmental Inc., Oakville (CA)

( * ) Notice: Subject to any disclaimer, the term of this patent is extended or adjusted under 35 U.S.C. 154(b) by 127 days.

(21) Appl. No.: 11/722,590

(22) PCT Filed: Aug. 12, 2005

(86) PCT No.: PCT/CA2005/001250

§ 371 (c)(1),
(2), (4) Date: Aug. 13, 2007

(87) PCT Pub. No.: WO2006/015496

PCT Pub. Date: Feb. 16, 2006

(65) Prior Publication Data

US 2008/0314826 A1    Dec. 25, 2008

(30) Foreign Application Priority Data

Aug. 12, 2004  (CA) .................................. 2477333
Aug. 12, 2004  (WO) ............... PCT/CA2004/001495
Aug. 12, 2004  (WO) ............... PCT/CA2004/001496

(51) Int. Cl.
C02F 3/28    (2006.01)
B01D 63/04   (2006.01)
B01J 19/24   (2006.01)

(52) U.S. Cl. .................................... 210/603; 210/615
(58) Field of Classification Search ................ 210/601, 210/603, 615
See application file for complete search history.

(56) References Cited

U.S. PATENT DOCUMENTS

| | | | |
|---|---|---|---|
| 4,181,604 A * | 1/1980 | Onishi et al. .................. 210/615 |
| 5,282,964 A * | 2/1994 | Young et al. .............. 210/321.8 |
| 5,523,003 A | 6/1996 | Sell et al. |
| 6,299,774 B1 * | 10/2001 | Ainsworth et al. ........... 210/603 |
| 6,387,262 B1 * | 5/2002 | Rittmann et al. ........ 210/321.89 |
| 6,641,733 B2 * | 11/2003 | Zha et al. ..................... 210/615 |
| 7,186,340 B1 * | 3/2007 | Rittmann et al. ............ 210/604 |
| 2004/0211723 A1 | 10/2004 | Husain et al. |

FOREIGN PATENT DOCUMENTS

CA    1096976    3/1981
CA    1177977    11/1984

OTHER PUBLICATIONS

Casey E. et al (1999) "Review of membrane aerated biofilm reactors". Resouces, Conservation and Recycling. 27 (1999): 203-215.

* cited by examiner

*Primary Examiner*—Fred Prince
(74) *Attorney, Agent, or Firm*—Bereskin & Parr LLP/S.E.N.C.R.L., s.r.l.

(57) ABSTRACT

A hollow gas transfer fiber is arranged in tows and potted into a module. The module may be used to treat wastewater by supplying hydrogen containing gas via the interior of the fibers to a biofilm present on an exterior surface of the fibers.

11 Claims, 9 Drawing Sheets

MEMBRANE SUPPORTED BIOFILM PROCESS FOR AUTOTROPIC REDUCTION

This application is the U.S. National Phase of International Application PCT/CA2005/001250 filed on Aug. 12, 2005, which claims priority to Canadian Application Ser. No. 2,477,333, PCT/CA2004/00 1495 and PCT/CA2004/001496 filed on Aug. 12, 2004, which is incorporated in their entirety by reference herein.

FIELD OF THE INVENTION

This invention relates to membrane supported biofilm processes and apparatus generally and, for example, to autotrophic water treatment, denitrification or endogenous respiration in such processes or using such apparatus.

BACKGROUND OF THE INVENTION

U.S. Pat. No. 5,116,506 to Williamson et al. describes a gas permeable membrane which divides a reactor vessel into a liquid compartment and a gas compartment. A biofilm is grown on the gas permeable membrane on the liquid side of the membrane. The biofilm is chosen from bacteria to degrade certain pollutants by means of anaerobic fermentation, aerobic heterotrophic oxidation, dehalogenation, and hydrocarbon oxidation. This is accomplished by means of oxygen and alternate gases (i.e., methane) through the gas permeable membrane to certain bacteria growing on the liquid side of the gas permeable membrane.

SUMMARY OF THE INVENTION

The following summary is intended to introduce the reader to the invention, but not to define it. The invention may reside in any combination of one or more of the apparatus elements or process steps found in any part of this document. It is an object of the present invention to improve on, or at least provide a useful alternative to, the prior art. It is another object of the present invention to provide a gas transfer module or system. It is another object of the present invention to provide a process for using a membrane supported module for treating wastewater, for example wastewater having nitrates or other oxidized species.

In one aspect, the invention provides a tow of hollow fibers. The fibers are fine, for example with an outside diameter (OD) of 100 μm or less. To facilitate building modules with minimal reduction in the effective surface area of the fibres, the fibres are processed or used as tows over a significant portion, for example one half or more, of their length. Modules may be made directly from the tows without first making a fabric. The tows may also be made into open fabrics to facilitate potting, for example along the edges of the fabric sheet, while leaving significant portions of the fibres as tows, for example a portion between the edges of the fabric sheet. The modules made from tows may be potted at both ends, or one end only with the other end left unpotted with fibre ends open to permit exhaust gas to escape. A single header module may be inserted in a reactor in a vertical configuration with the header at the bottom and the fibres floating upwards. Such a module may be aerated from outside the module to remove accumulations of trash and solids. Feed may also be screened, for example through a 0.5 mm screen, to reduce trash in the feed before it enters the reactor. Where the tow module is used in a downstream stage of a multi-stage reactor, the upstream stage may also reduce the amount of trash fed to the tow module reactor. A reactor may be used to treat secondary effluent in a municipal or industrial wastewater treatment plant or other feeds rich in nitrates or other oxidized species.

In another aspect, a reactor is provided for treating wastewater rich in nitrates or other oxidized species, but poor in COD, for example 100 mg/L or less or 20 mg/L or less of COD. The reactor can include a module having a hydrogen transfer area of equal to 10 or more, or between 10 and 0.1, times the outer surface area of a biofilm attached to the fibres of a membrane module. A pure hydrogen or hydrogen containing gas stream can be fed to the lumen of the module, with reaction occurring in the biofilm grown on the surface of the fibre. Hydrogen depleted gas can be discharged after or without incineration depending, for example, on the concentration of any impurities.

In another aspect, a reactor is used to grow autotrophic microorganisms on the outside surface of the fibres and tows by supplying hydrogen to the lumen of the fibre. Wastewater containing oxidized species, for example nitrates, for example as found in secondary wastewater effluent, can be fed to this reactor and a denitrification reaction can occur in the biofilm. Harmless nitrogen gas is generated and can be discharged to the environment. Wastewater with a very low nitrate nitrogen concentration, for example 10 mg/L or less, or 2 mg/L or less, may be discharged to a receiving stream.

In another aspect of this invention, the biofilm surface area of a module or an operating process or both provide a hydrogen to microorganism ratio (H/M) such that the endogenous respiration of microorganisms is comparable in magnitude to microbial growth rate to maintain a stable biofilm.

In another aspect of this invention, an autotrophic reduction reactor is fed a gas from an anaerobic digester on site. This gas may contain hydrogen, carbon dioxide and methane. The gas is passed through the lumen of hollow fibre. Hydrogen and some methane can be consumed by the autotrophic microorganisms and the gas leaving the membrane lumen can be returned to the anaerobic digester gas systems for further heat recovery or burn-off to destroy these gases prior to discharge. Such gas may be treated to remove mist, or cooled to remove excess moisture, but may require no or little other purification steps to provide hydrogen enrichment. The fibre and module described in the invention may provide the hydrogen purification step.

In another aspect of this invention, an anaerobic digester may be modified to insert an acid conversion stage to maximize production of hydrogen.

In another aspect of this invention, the methane rich gas produced in an anaerobic digester may be converted to a hydrogen and carbon dioxide rich stream by a steam reforming process. However, such gas may not be further purified by removing carbon dioxide and a mixture of hydrogen and carbon dioxide may be fed directly to the lumen side of a membrane supported biofilm module, for example as described in this document. The exhaust gas may contain some unreacted hydrogen and may be burned off to destroy this prior to discharge.

In another aspect of this invention, natural gas or liquefied petroleum gas may be converted to a hydrogen and carbon dioxide rich stream by a steam reforming process. However, such gas may not be further purified by removing carbon dioxide and a mixture of hydrogen and carbon dioxide may be fed directly to the lumen side of a membrane supported biofilm module, for example a module as described in this invention. The exhaust gas may contain some unreacted hydrogen and may be burned off to destroy this prior to discharge.

In another aspect of this invention, a bioreactor, for example as described above, may be operated as a continuously stirred tank reactor with a generally oxidized species concentration, for example nitrate concentration, in the secondary effluent close to the discharge concentration to promote a uniform rate of reaction at the biofilm surface.

In another aspect of this invention, a bioreactor may be operated under plug flow conditions, for example to enhance reaction rates. Such a bioreactor or process may be used for wastewater streams containing very low concentrations of toxic species such as chlorates or arsenates.

BRIEF DESCRIPTION OF THE DRAWINGS

Embodiments of the invention will be described below with reference to the following figures.

FIG. 4b is a top view of a sheet module using sheets of the fabric of FIG. 4a.

DETAILED DESCRIPTION OF THE EMBODIMENTS

Figure 1:
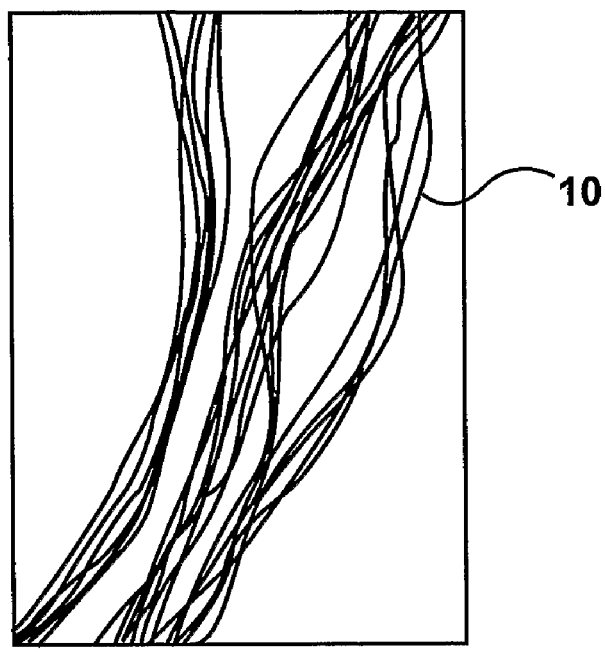
FIG. 1 is a front view of a plurality of membrane fibres.
Figure 1A:
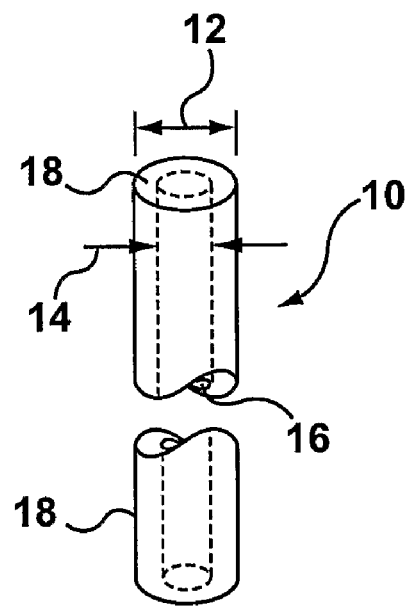
FIG. 1a is a perspective view showing a fibre of FIG. 1 in greater detail.

FIGS. 1 and 1a show a textile polymethyl pentene (PMP) fibre 10 with 45 micron outside diameter 12 and 15 to 30 micron inside diameter 14. The fibre 10 is made by a melt extrusion process in which the PMP is melted and drawn through an annular spinnerette. The raw polymer used was MX-001, produced by Mitsui Petrochemical. The fibres 10 are hollow inside (defining lumens 16) but non-porous with dense walls 18. Other fibres may also be used, for example stretched microporous PE or PP fibres, treated to be hydrophobic, may be used. The fibres 10 may have various diameters and may be fine fibers having outside diameters of less than 100 microns, for example between 30 and 100 microns or between 50 and 60 microns. Oxygen or other gases may travel through the fibre walls 18.

Figure 2:
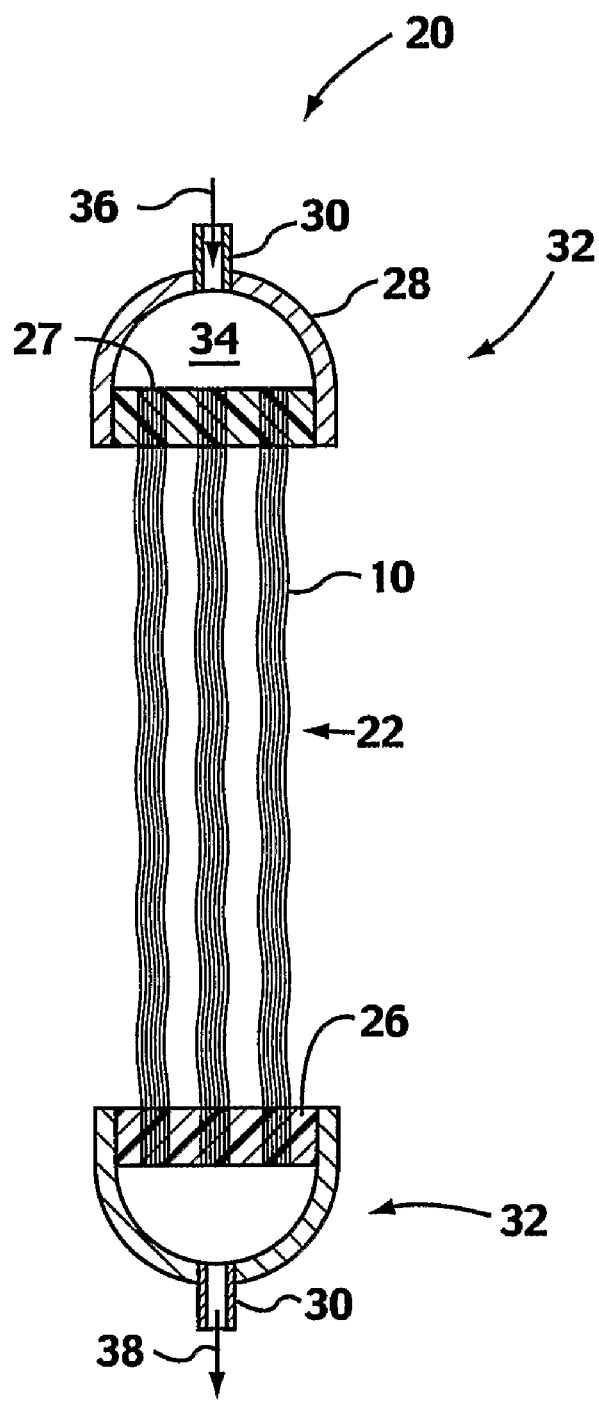
FIG. 2 is an elevation view of the fibres potted as tows.

FIG. 2 shows a module 20 with fibres 10 arranged and potted in tows 22 of fibres 10. The tows 22 are made of a loose collection of a plurality of fibres 10, for example between 1 and 200 or 16 to 96 fibres. The fibres 10 may be lightly twisted together or left untwisted. The fibres 10 may be curled, crimped or undulating to provide three dimensional structure to each potted tow 22. Curling may be achieved by re-winding the fibres 10 onto a bobbin while varying the tension on the fibres 10. The individual fibres 10 remain separable from each other in the tow 22. Such a tow 22, when coated with a thin biofilm 24, for example of less than 1 mm thickness, may provide a ratio of gas transfer area through the fibre walls to biofilm outer surface area ($SA_{gas}/SA_{biofilm}$) of less than 2.5, less than 1 or between 0.1 or 0.2 and 1. Inert fibres may be added to the tow 22 to strengthen it if required.

Each tow 22 is potted into a plug of resin 26 so that its ends 27 are open at one face of the resin. The plug of resin 26 is glued into a plastic header enclosure 28 having a port 30 which forms a header 32 connecting the port 30 to the open ends 27 of the fibers 10 through a cavity 34. In the embodiment illustrated, the module 20 has two headers 32, one associated with each end 27 of the fibres 10, although modules with only an inlet header may also be made. With two headers 32, air or other gases may be input into one header 32 (e.g. inlet gas 36), flow through the fibres 10 and exhaust from the second header (e.g. exhaust gas 38). Tows 22 are potted in a resin 26 such as polyurethane, and the potted ends are cut to expose the fibre lumen 16. Alternately, a fugitive potting material may be used to block off fibre ends, as described in U.S. Pat. No. 6,592,759, or other potting methods may be used. In FIG. 2, the number of tows 22 and the number of fibers 10 per tow 22 are both small for clarity in the drawing and may be much larger in practice.

Figure 3:
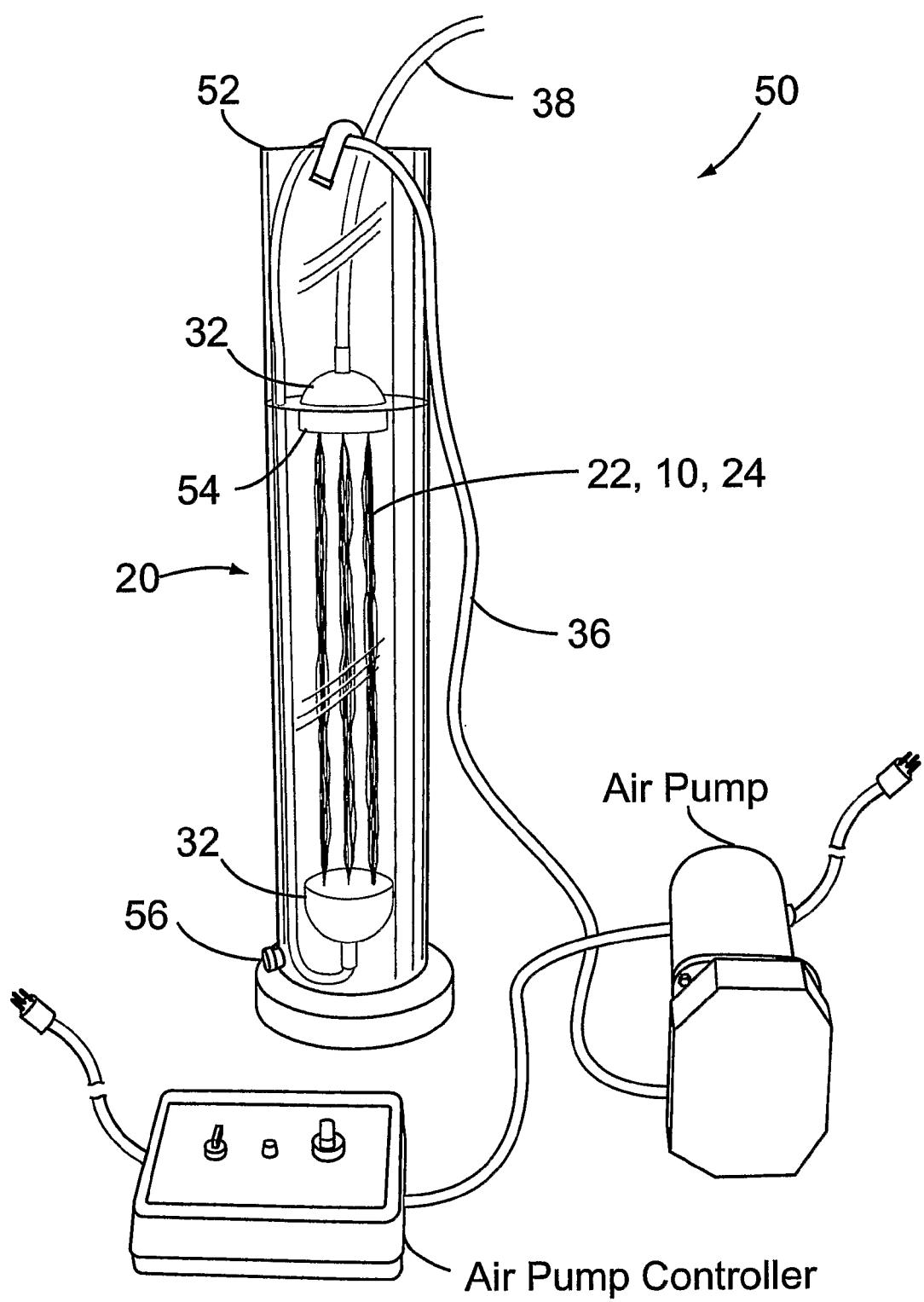
FIG. 3 is a photograph of a bench scale test module using tows of fibres.

FIG. 3 shows a bench scale treatment reactor 50 including a module 20 made by potting 100 tows 22, each of 96 fibres 10 as shown in FIG. 1, into an opposed pair of headers 32. The module 20 was tested to treat a feed water in a batch process. In the test process, the module 20 was located in a tank 52 filled to 4 L with a feed 54 of synthetic wastewater. The tank 52 was drained via drain 56 and filled with fresh feed 54 every 2 to 7 days. Air 36 was applied to the module 20 at 30 mL/min. A biofilm 24 of stable thickness grew on the module 20 for a period of over 6 months. The biofilm 24 was essentially endogenous, its rate of growth generally equal to its rate of decay, except that a small part of the biofilm 24 broke off and was discharged with some of the tank drains.

The module 20 and reactor 50 of FIG. 3, with autotrophic microorganisms grown on the surface of the fibre 10, could be used to treat wastewater streams containing oxidized species such as secondary effluent from a wastewater treatment plant containing a high level of nitrate. Calculations based on kinetics of autotrophic denitrification, show that a hydrogen to microorganism ratio of less than 0.05 g hydrogen consumed/g volatile suspended solids (VSS) per day, and preferably less than 0.026 g of hydrogen/g VSS/d will maintain conditions such that endogenous respiration of microorganisms generally equals growth, resulting in a stable biofilm thickness. At H/M ratios above these amounts, further methods of biofilm control, for example as described further below, may be required to keep the biofilm thickness below a specified amount, for example 1 mm.

Figure 4A:
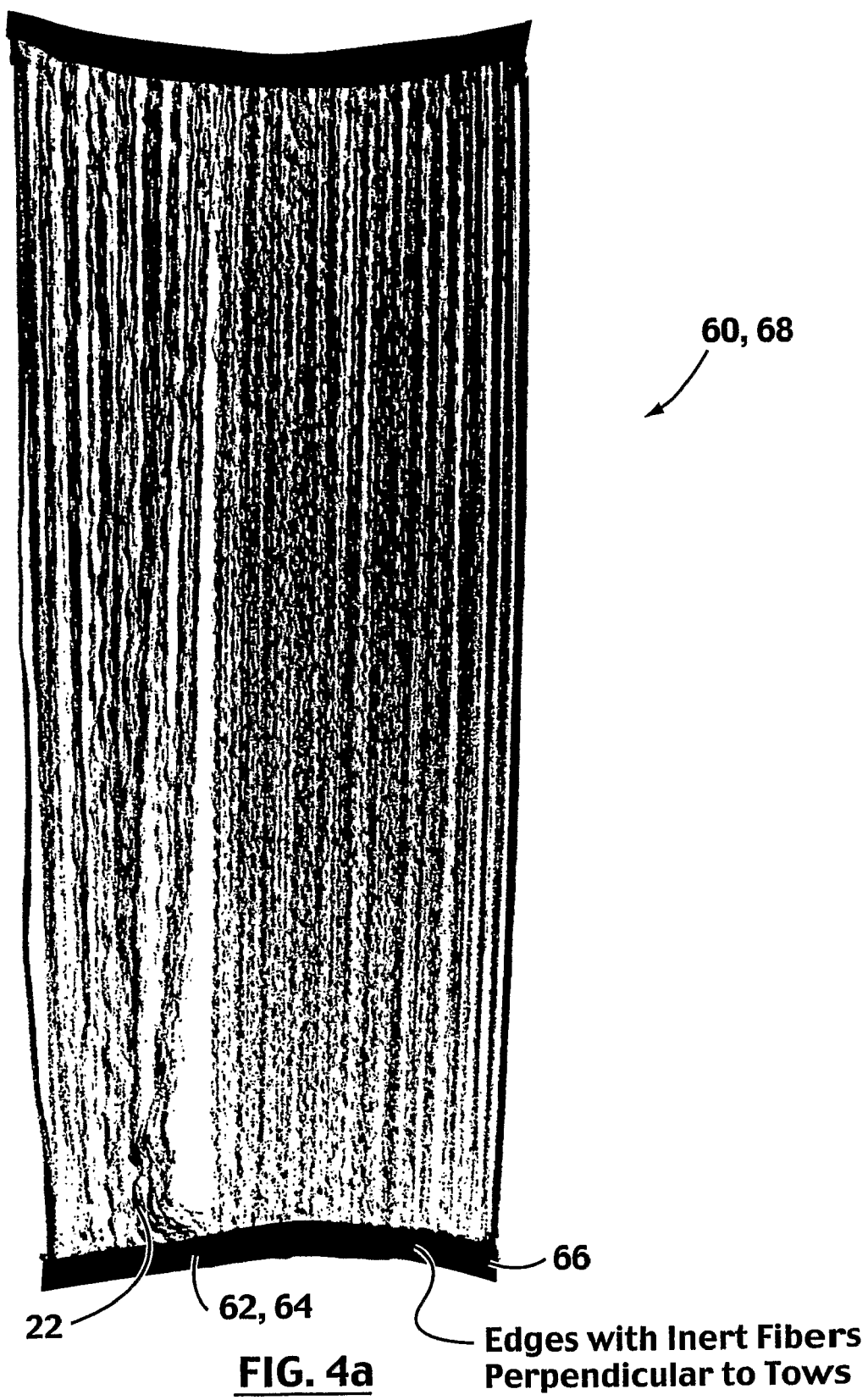
FIG. 4a is a photograph of an open fabric made of tows.
Figure 4B:
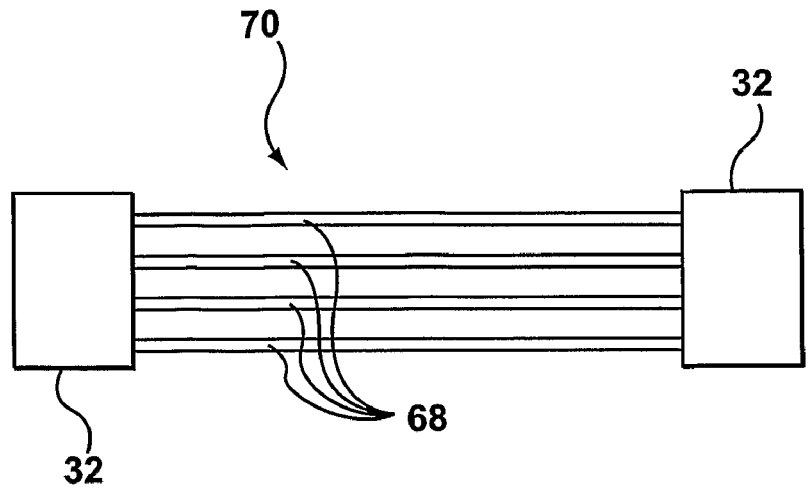

FIG. 4a shows an open fabric 60 made by weaving tows 22 through the shuttle of a loom and crossing the tows 22 with an inert fibre 62 only along the edges of the fabric 60. The fabric 60 is approximately 1.3 m wide, that is, it has active fibres 10 of about 1.3 m long, and has inert fibers 62 woven perpendicularly to the tows 22 in a strip 66 of about 2 cm along the edges 64. The tows 22 remain unrestrained between these strips 66. The resulting roll of fabric 60 is cut into sections of about 20-200 cm or 30-60 cm width to make individual sheets 68. The sheets 68 are cut along the woven edges to open the ends 27 of the fibres 10 and potted with a 0 to 10 mm space between them into one or a pair of opposed headers. Depending on the potting method used, the fibres 10 may be cut open either before or after they are inserted into the potting resin 26.

Referring to FIG. 4b, 1 to 100 or 8-20 sheets 68 may be potted into a pair of headers 32 to produce a sheet-style tow module 70 (also referred to herein simply as a "sheet module"). The sheet module 70 may be assembled in cassettes and placed in a bioreactor to which a nitrate rich stream is introduced. Hydrogen rich gas may be introduced in the lumens 16 and the wastewater treated by the autotrophic biofilm grown on the surface to reduce nitrate in the wastewater prior to its discharge.

In a batch process, the concentration of treated substances in the wastewater generally decreases towards the end of each processing period. Demand for hydrogen supplied to the biofilm also decreases and so the gas supply to the modules may be reduced. Modules using fibres at least partially in the form of tows allows a very high surface areas for hydrogen transfer and biofilm growth. Tow modules (whether or not sheet-style) are particularly useful in treating wastewater having a low nitrate or COD concentration or both, for example 100 mg/L or less of COD or 50 mg/L or less of nitrates or both, or 5 mg/L or less of chlorates, because they provide large surface areas. Pressure loss through the fine fibre lumens is not limiting with the amount of gas supply required to deliver gases to a biofilm treating low oxidant wastewater.

Although tow modules may be useful for treating other wastewaters as well, tow modules can be used where the initial feed has a low oxidant concentration, or as a second or third stage behind other treatment processes or apparatus that reduce the oxidant concentration of stronger feedwaters. With industrial wastewater or secondary effluent or other feeds, for example feeds having a nitrate concentration of 1,000 mg/L or more, a two stage apparatus may be used. In a first stage, membrane supported biofilm modules in the form of a fabric sheet extending between a pair of headers are used as described in U.S. Provisional Application No. 60/447,025, which is incorporated herein in its entirety by this reference to it. The outlet from a reactor containing these modules is fed to a reactor containing tow modules as described in this document which provides second stage treatment.

Further details of biomass growth control aspects of the present invention will now be described with reference to FIG. 6. A reactor 150 is shown, being similar to the reactor 50 of FIG. 3, and like features are identified by like reference characters, incremented by 100. The reactor 150 has a tank 152 holding tank wastewater 154. In the embodiment illustrated, the tank 152 has a tank capacity of about 3.7 L, and is filled with about 3 L of the tank wastewater 154. The tank 152 has an inlet 157 for receiving raw wastewater, and an outlet 159 for discharging treated wastewater.

A module 120 is provided in the tank 152 of the reactor 150. The module 120 has fibres 110 arranged in tows 122 and extending between opposed headers 32. In the embodiment illustrated, the module 120 has 5600 fibres 110, arranged in 80 tows 122 of 70 fibres 110 per tow 122. Each fibre 110 has a length of about 38-45 cm, an OD of about 58.2 microns, and an ID of about 41.7 microns. The module surface area ($SA_{gas}$) is about 0.39 square meters.

Each of the headers 132 is piped to a gas supply line 161, which receives an inlet gas 136 from a gas supply 163. In this configuration of the illustrated embodiment, the module 120 is operated in a "dead end" gas supply operation, since neither of the ends 127 of the fibres 110 are used for exhausting gas from the lumens 116.

In the embodiment illustrated, the gas supply 163 receives hydrogen gas from a hydrogen source 165 and carbon dioxide gas from a carbon dioxide source 167, and mixes these two gases together to form the inlet gas 136. The inlet gas 13 is fed to the fibre lumens 116 to support the growth of biofilm 124 on the outer surface of the fibres 110.

The reactor 150 is further provided with a mixer 171 for mixing or agitating the contents of the tank 152 to provide uniform substrate distribution therein. The mixer 171 can include an aerator. The reactor 150 is further provided with a pH probe 173 for monitoring the pH of the tank wastewater 154, and a pH buffer 175. The reactor 150 can further be provided with a DO probe 177 and a carbon dioxide sampling port 179.

During operation of the reactor 150, a film of biomass 124 can grow on the outer surface of each of the fibres 110. The biomass 124 generally consumes "food" that can include, for example, nitrates, hydrogen, or other components. The greater the biomass population, the greater the amount of food necessary to sustain its growth. At an equilibrium food-to-microorganisms (biomass) (F/M) ratio, a particular amount of food can be supplied to a particular population of biomass that is just enough to support the given biomass population. At such an equilibrium F/M ratio, the rate of biomass growth generally equals the rate of decay, so that there is no net increase in biomass population.

In a hydrogen driven autotrophic denitrification process, the chemical reaction can be described by the following equation:

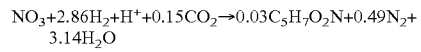

$$NO_3 + 2.86H_2 + H^+ + 0.15CO_2 \rightarrow 0.03C_5H_7O_2N + 0.49N_2 + 3.14H_2O$$

The theoretical equilibrium F/M ratio can be expressed in terms of the amount of hydrogen provided per unit amount of VSS in the tank water, and, for the given example, is $F/M_{EQ}H2=0.076$ g $H_2$/gVSS per day at 25° C. This corresponds to an (equilibrium) autotrophic denitrification rate of, approximately, $ADR_{EQ}=0.194$ g $NO_3$—N/gVSS per day at 25° C.

To limit the growth of the biomass so that a relatively thin film is maintained on the fibres 110, the supply of hydrogen can be maintained at a value below the $F/M_{EQ}H_2$. Alternatively or additionally, the autotrophic denitrification load rate can be limited to a value below the $ADR_{EQ}$, for example, by limiting the nitrate feed rate to the reactor 150. For example, using the term $F/M_{EQ}NO_3$ to designate an equilibrium supply rate of $NO_3$ that is just sufficient to support the $ADR_{EQ}$, then the supply of $NO_3$ in the reactor 150 can be limited to a level below $F/M_{EQ}NO_3$ to limit the growth of the biomass 124.

In a particular embodiment, the reactor 150 can be operated with an excess supply of hydrogen (i.e. supply of hydrogen greater than $F/M_{EQ}H_2$), and a limited supply of nitrate to maintain a denitrification loading rate below the $ADR_{EQ}$. This configuration can provide a thin and stable biofilm thickness that avoids clumping of the biofilms on adjacent fibres 110 and provides effective denitrification, as illustrated in "Example 2", below.

Figure 6:
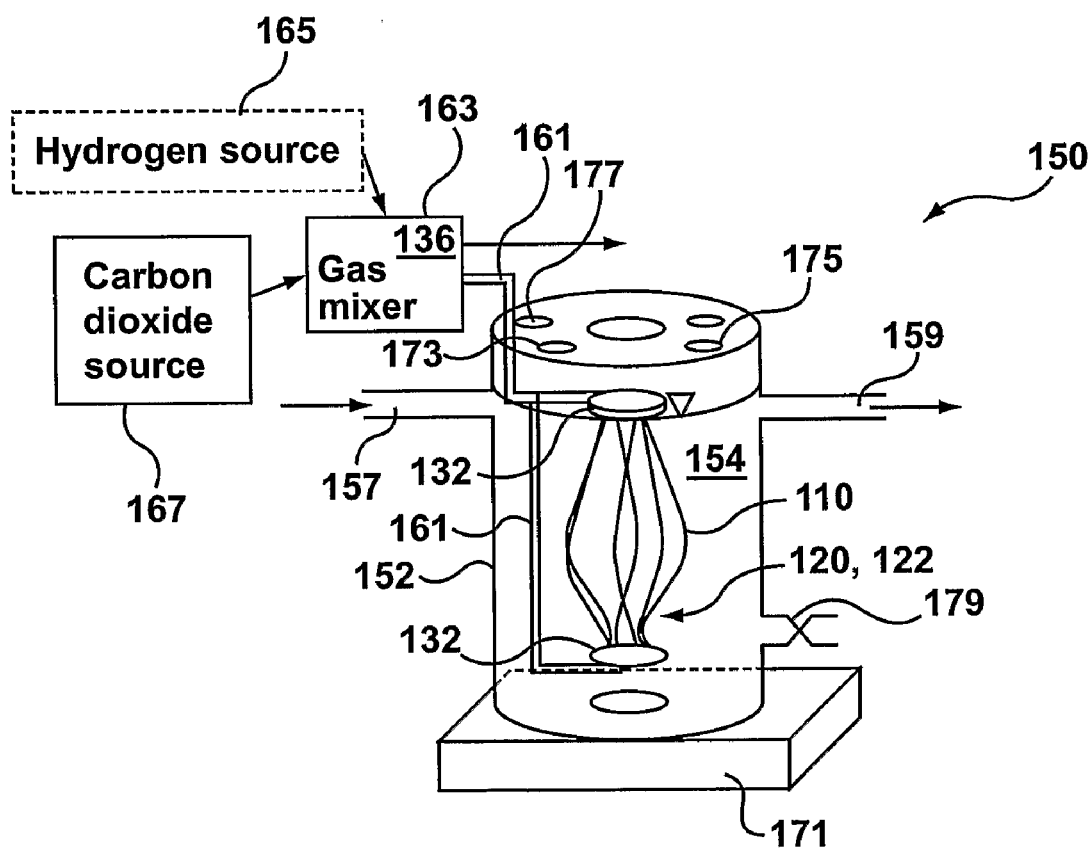
FIG. 6 is a schematic view of a reactor apparatus in accordance with the present invention.

The reactor 150 of FIG. 6 can alternatively be used in a methane driven denitrification process. The gas supply 163 can include methane gas, which can be fed to the lumens 116 of the fibres 110 in a dead-end or a flow through configuration. The tank 152 can be operated in a batch mode, emptying and refilling the tank 152 between discrete processing cycles. The supply of food made available for the biomass 124 on the fibres 110 can be limited to control the thickness of the biomass films so that the thickness remains generally stable and sufficiently thin to avoid clumping with the biomass 124 on adjacent fibres 110. Results of an experiment using the reactor 150 of FIG. 6 is presented below under the heading "Example 3".

Canadian Patent Application No. 2,477,333; International Application Nos. PCT/CA2004/000206, PCT/CA2004/001495, and PCT/CA2004/001496; and U.S. Ser. No. 10/896,086 are all incorporated herein in their entirety by this reference to them.

It is to be understood that what has been described above and in the following examples are preferred embodiments of the invention. The invention nonetheless is susceptible to certain changes and alternative embodiments without departing from the subject invention, the scope of which is defined in the claims appended hereto.

EXAMPLE 1

A batch $H_2$ denitrification process was tested in a small sheet reactor having a module of sheet of fibers extending between a pair of headers. In the present example, the reactor was provided with sheet modules constructed of tows, similar to that of FIG. 4b (above). The test involved growing autotrophic microorganisms (biofilm) on the surface of the sheet by providing hydrogen to the lumens of the fibers of the tows. The reactor working volume was 20 litres, the effective sheet area was 0.108 $m^2$, and the temperature was about 20° C. The hydrogen pressure was about 2 psi.

Biofilm on the sheet was generated aerobically to a thickness of about 1 mm using synthetic sewage. The biofilm was acclimated with pure hydrogen gas for two days before the first run. The gas discharge port on the module was closed to feed hydrogen in a dead-end manner. Municipal tapwater, spiked with $NaNO_3$ (45 mg/L $NO_3$—N) and $NaCO_3$ (100 mg/L $CaCO_3$) was used as the substrate. No agitation was used. The sheet was removed to stir the tank immediately prior to sampling (once per day). The reaction rate was steady at approximately 2 g $NO_3$—N/$m^2$/d from 45 to 3 mg/L of $NO_3$—N. The reaction rate dropped to about 0.3 g/$m^2$/d at a final concentration of 0.6 g/L of $NO_3$—N.

Figure 5:
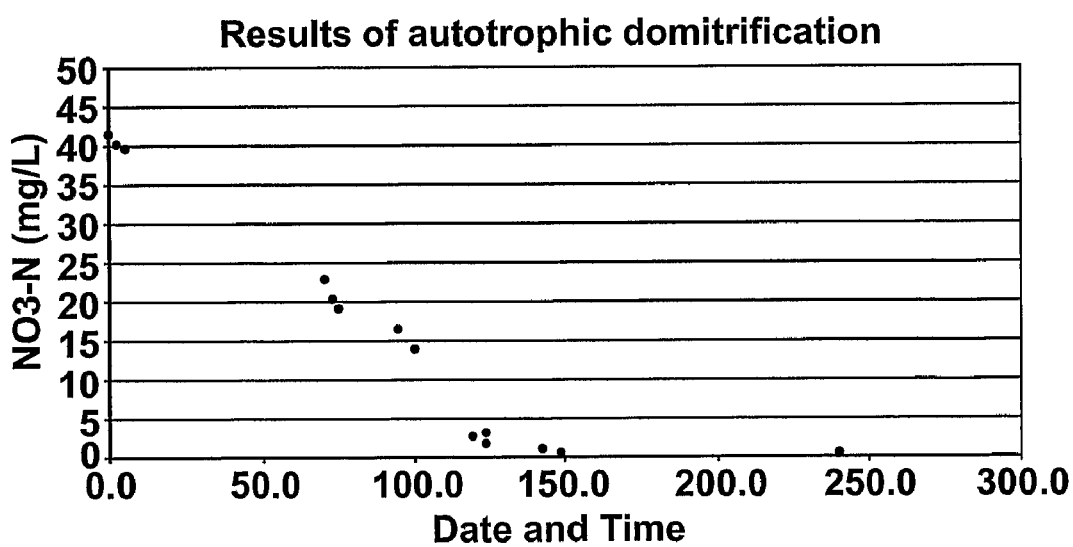
FIG. 5 is a graph showing the results of experiments with the module of FIG. 4b.

FIG. 5 shows the concentration of nitrate (as total nitrogen in mg/L) as a function of time in the reactor. Generally, in biofilm processes, the rate of reaction in the biofilm is directly proportional to the concentration of the substrate. To the inventor's surprise, the above results show that the relationship between time and concentration of nitrate, expressed as Total Nitrogen, is constant down to 2 mg/L. It is therefore possible to use a continuously stirred tank, operating at a concentration of 2 mg/L of nitrate expressed as Total Nitrogen or more. Advantageously, a constant reaction rate throughout the biofilm is achieved, providing uniform biofilm growth and maintenance. Overall treatment rates can be controlled to below a rate at which endogenous respiration equals microbial growth to maintain a self-sustaining biofilm, while producing high quality effluent at a high rate.

EXAMPLE 2

An experiment was conducted to demonstrate the effectiveness of biofilm control in an autotrophic denitrification bioreactor with a membrane supported biofilm by controlling the F/M ratio, specifically the nitrate concentration in the feed to provide a biomass inventory in the reactor in such a manner that microbial growth rate equaled or was less than the decay rate when the biofilm reached a specified thickness, for example 1 mm. The experimental apparatus included a bioreactor generally similar to the reactor 150 shown in FIG. 6. The reactor 150 was operated in a continuous flow regime with an HRT equal to 4 hours (⅙ days). The nitrate feed concentration was 15 mg/l, and the bioreactor nitrate inventory at the start was 45 mg. Influent rate was about 15 to 16 ml/min.

Uniform substrate distribution was assured through continuous mixing. The pH of the applied wastewater was in the range of 7.5-7.7. pH of the wastewater increased in the reactor as a result of denitrification to values in a range from 7.7-9.2. No pH control was implemented, except for providing a buffer solution in the feed. Temperature in the reactor was maintained at 25° C.+/−3° C.

Figure 7:
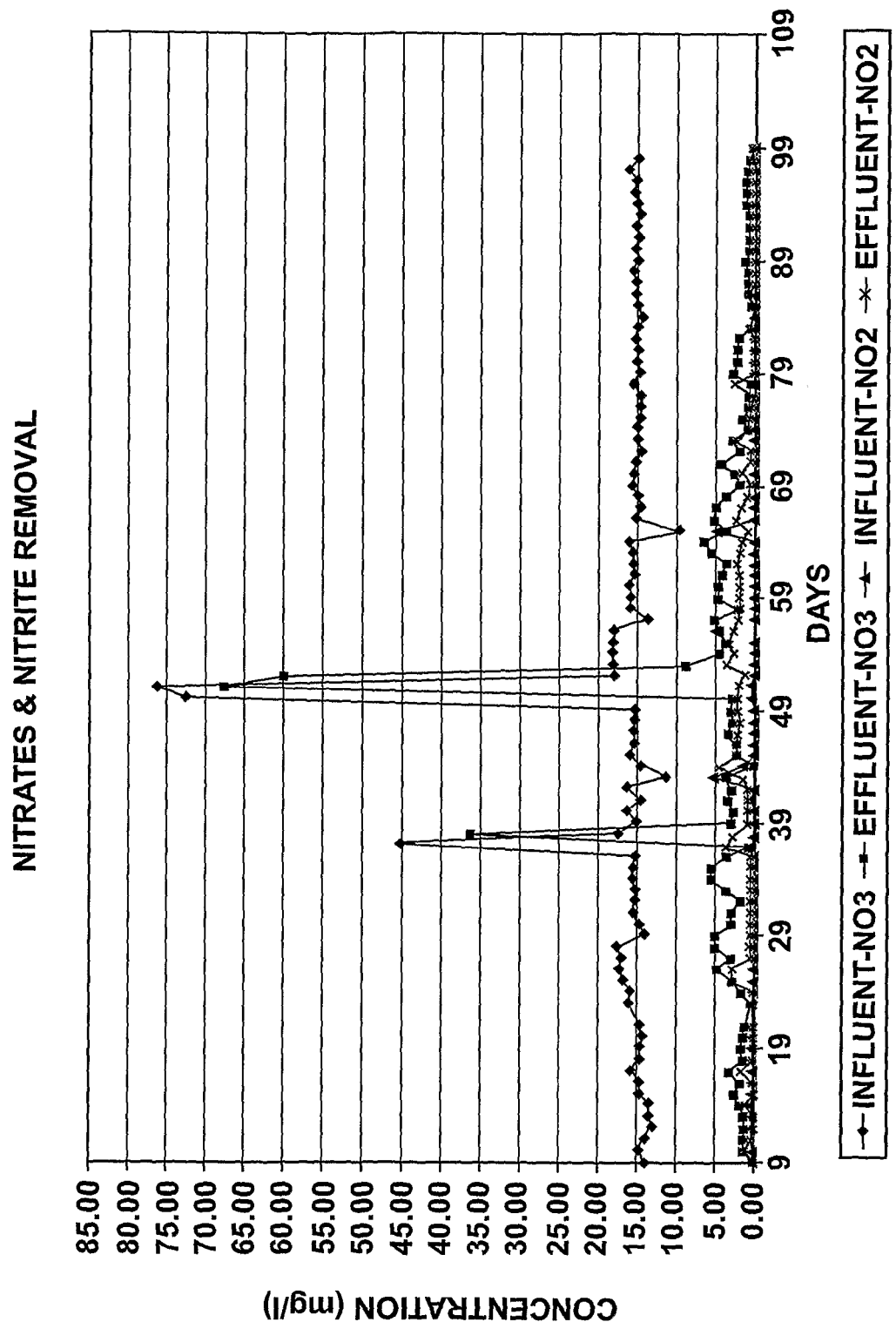
FIGS. 7 and 8 are graphs showing results of experiments with the apparatus of FIG. 6 using hydrogen driven denitrification.
Figure 8:
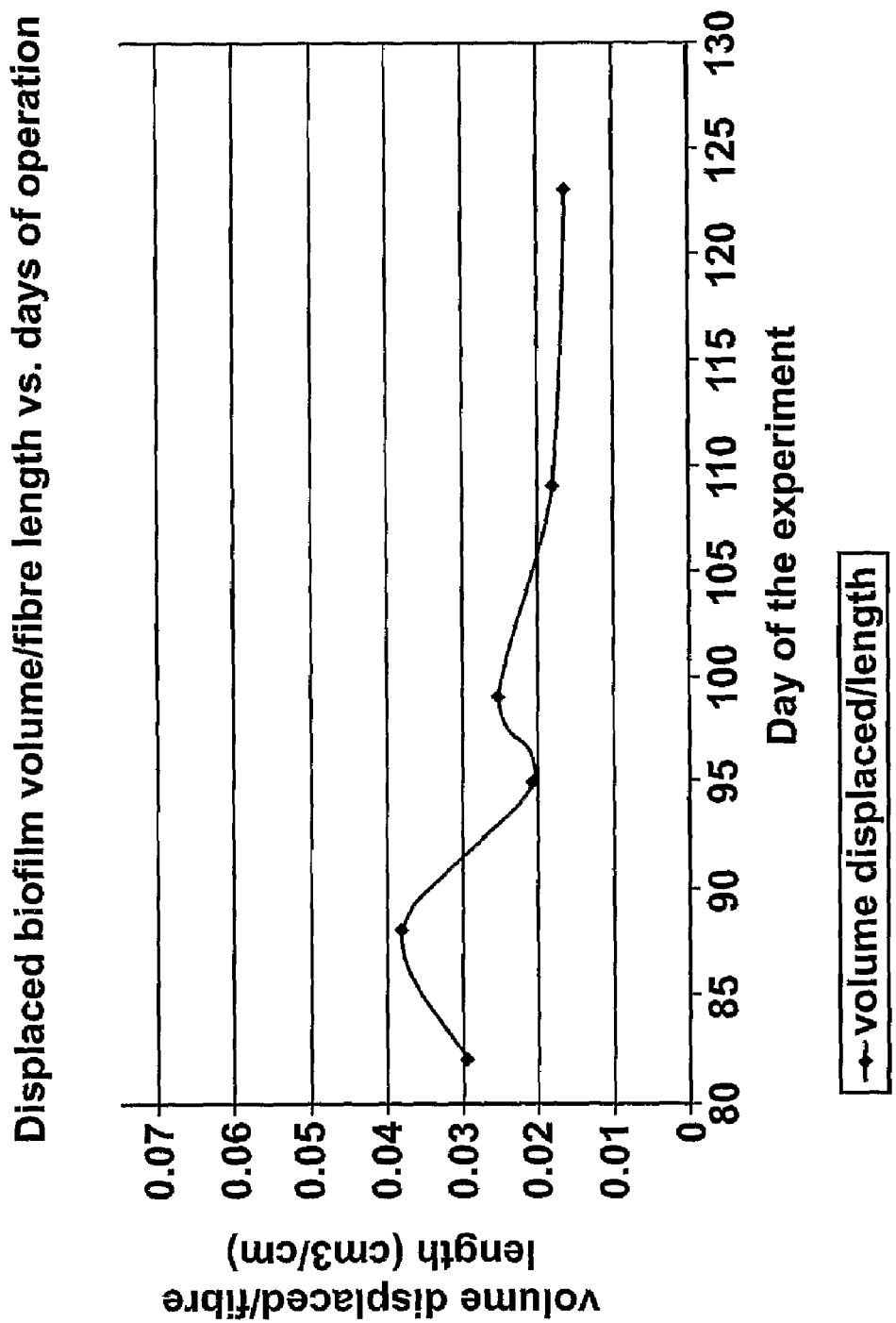

During operation, the initial NO3-N concentration was in the range of about 15-20 mg/L. The nitrate removal rate was about 180-235 mg/day. The denitrification rate was about 460-610 mg/day*m2. The food supply in terms of hydrogen gas was maintained at about 0.46 g H2 per g VSS per day, well above the F/MEQH2. The denitrification loading rate was limited to within a range of about 0.06-0.09 g NO3-N per g VSS per day. A graph showing the reactor performance is shown in FIG. 7, indicating that nitrate reduction of 75% or greater was consistently achieved.

A first biofilm analysis started after day 80 and continued until the biofilm was no longer fragile. The change in biofilm thickness was measured by using a displacement method. The module with biofilm was removed from the reactor and placed in vertical position for 1-2 min to allow excess water to drain. Samples of biomass grown on a known surface area were scraped from the module with wooden sticks and put into a 5 ml plastic syringe with a sealed end which was partially filled with deionized water to determine the displaced volume. Biofilm thickness was calculated by dividing the liquid volume displaced by the biomass with the area (determined knowing the length and number of fibers) of the biomass scraped from the module. Results are presented in the graph shown in FIG. 8. It can be seen that the biofilm thickness became stable after 100 days of operation.

Microscopy was used to measure biofilm thickness after day 110 of operation. Using this technique the average biofilm thickness was determined to be between 0.17-0.25 mm.

This example indicates that by controlling nitrate feed rate such that a nitrate treatment rate is maintained below a value where microbial growth equals decay, a stable biofilm can be maintained over a long period of time, while providing effective denitrification.

EXAMPLE 3

Methane denitrification studies were performed using a membrane module composed of 9600 hollow fibres of 45 um diameter. The module was submerged in wastewater containing a nitrate solution, and methane was fed to the lumen of the fibers in a dead-end mode at 2.4 to 3.1 psig. A biofilm, composed presumably of methanotrophic bacteria, grew on the surface of membrane.

The substrate was a synthetic wastewater comprised of sodium nitrate, potassium phosphate and tap water. The system was operated as a batch reactor with a feed nitrate concentration typically between 90 and 110 mg/L. As shown the following table, the nitrate concentration at the end of a batch ranged from 0.5-20.6 mg/L. The batch length varied between 4 and 19 days.

Table showing Feed and Effluent NO3-N concentrations for batch tests

|  | Batch length, days | Inlet NO3 (mg/L) | Outlet NO3 (mg/L) |
| --- | --- | --- | --- |
| Test 1 | 13.15 | 107.5 | 20.6 |
| Test 2 | 8.92 | 90.5 | 0.7 |
| Test 3 | 6.82 | 99.5 | 0.9 |
| Test 4 | 3.80 | 94.0 | 11.7 |
| Test 5 | 9.76 | 98.5 | 0.8 |
| Test 6 | 13.76 | 99.0 | 0.5 |
| Test 7 | 9.00 | 69.5 | 3.6 |
| Test 8 | 19.00 | 120.0 | 18.5 |

Figure 9:
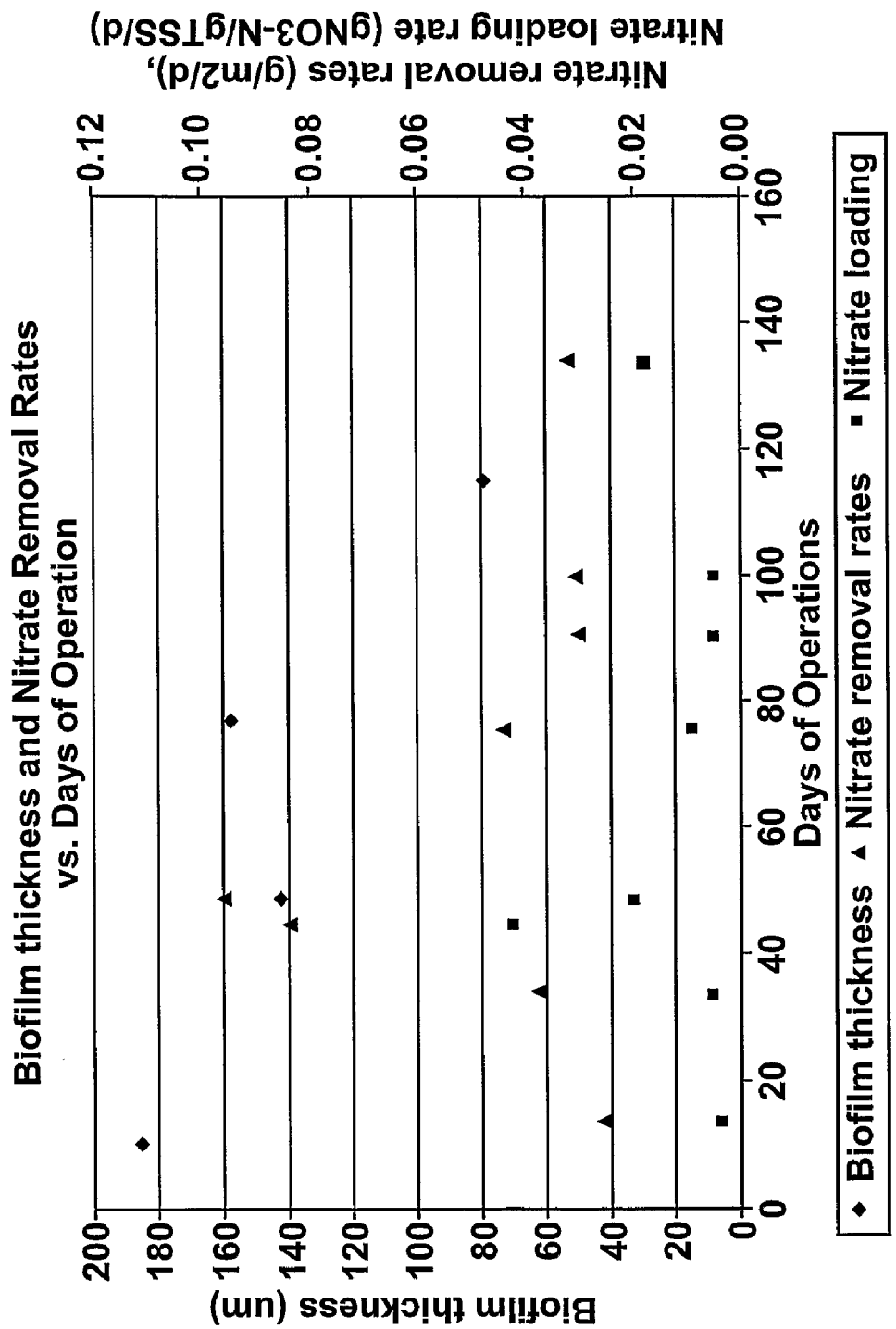
FIG. 9 is a graph showing results of experiments with the apparatus of FIG. 6 using methane driven denitrification.

The biofilm thickness throughout these tests was in the range of 79-186 microns as can be seen in FIG. 9. The nitrate loading rate varied between 0.0035-0.0423 gNO3—N/gTSS/d and the nitrate treatment rate 0.025-0.096 gNO3-N/m2/d (see FIG. 2), which is below the treatment rate at which net biofilm growth would occur.

This demonstrates that methane gas can be used as an electron donor in a methanotropic bioreactor membrane supported bioreactor for denitrification and that biofilm thickness can be maintained at a stable rate by controlling the average treatment rate.

We claim:

1. A method of treating wastewater comprising:
    a) providing a module having tows of fibers, the fibers each having an exterior surface exposed to the wastewater, a hollow interior, and a gas permeable wall between the interior and exterior surface;
    b) providing at least one of hydrogen and methane gas to the hollow interiors of the fibers, the gas penetrating the walls for feeding biofilm on the exterior surface of fibers,
    wherein the fibers have an outside diameter of 100 mm or less and the individual fibers remain separable from each other in the tows over at least one half of their lengths.

2. The method of claim 1 wherein the wastewater has 100 mg/L or less of COD.

3. The method of claim 1 further comprising maintaining the biofilm at a thickness of 1 mm or less and under endogenous respiration.

4. The method of any preceding claim wherein the gas is collected from an anaerobic digester.

5. The method of claim 4 wherein the gas is converted between the anaerobic digester and the module to convert methane to hydrogen.

6. The method of claim 1 wherein the gas is taken from a source of natural gas, petroleum or propane and converted to increase its hydrogen content before applying the gas to the module.

7. The method of claim 1 wherein the module and wastewater are located in a reactor operated as a continuously stirred tank reactor.

8. The method of claim 1 wherein the module and wastewater are located in a reactor operated under plug flow conditions.

9. The method of claim 1 wherein the amount of gas is limited to limit the biomass population growing on the surface of the fibers.

10. The method of claim 1 wherein the amount of gas is limited to an amount that is generally less than or equal to an amount sufficient to support biomass growth at a level equal to biomass decay.

11. The method of claim 1 wherein the biofilm is in the form of a relatively thin film on each fiber, the film on each fiber being sufficiently thin to maintain a ratio of gas transfer area through the fiber walls to the biofilm outer surface area of less than 2.5.

* * * * *